United States Patent [19]

Highstreet et al.

[11] 4,431,549

[45] Feb. 14, 1984

[54] FILTER ELEMENTS, APPARATUS AND METHODS

[75] Inventors: Edward J. Highstreet, Lake Wylie, S.C.; Forrest B. Stannard, Ft. Lauderdale, Fla.; Louis H. Piper; Michael A. Dimitriou, both of Richmond, Va.

[73] Assignees: DeHydro Corporation, Charlotte, N.C.; Infilco Degremont Inc., Richmond, Va.

[21] Appl. No.: 420,609

[22] Filed: Sep. 20, 1982

[51] Int. Cl.$^3$ .............................................. B01D 39/20
[52] U.S. Cl. .................................. 210/791; 210/290; 210/292; 210/506; 210/510.1
[58] Field of Search ............... 210/286, 290, 292, 485, 210/496, 503, 504, 506, 510, 791, 767, 271

[56] References Cited

U.S. PATENT DOCUMENTS

| | | | |
|---|---|---|---|
| 2,745,553 | 5/1956 | Riddick | 210/292 X |
| 4,190,534 | 2/1980 | Wyatt | 210/290 X |
| 4,340,478 | 7/1982 | Stannard et al. | 210/496 X |
| 4,381,998 | 5/1983 | Roberts et al. | 210/506 X |
| 4,382,863 | 5/1983 | Riise | 210/506 X |

*Primary Examiner*—Thomas G. Wyse
*Attorney, Agent, or Firm*—Carroll F. Palmer

[57] ABSTRACT

Modules for use in forming rigid filter beds by laying a plurality of the modules side-by-side upon a flat base are in the form of porous, planar elements having a continuous, polygonal upper surface, a continuous lower surface approximately coterminous to the upper surface, and sides normal to said surfaces of substantially equal depth much shorter than their length, such elements comprising laminated layers, each layer being formed of particulate material of substantially uniform size rigidly fixed together in a matrix of cured binder, the particles of the layers being substantially different in size than the particles of the adjacent layers, the top surface being flat and the bottom surface being channelled. In preferred forms, the modules' surfaces are square, there are only a top layer and a bottom layer, the top layer is much thinner than the bottom layer and the particles in the top layer are appreciably smaller than the bottom layer particles.

Methods of forming the modules and of using them to form filter beds are also disclosed.

10 Claims, 4 Drawing Figures

U.S. Patent  Feb. 14, 1984  4,431,549

FILTER ELEMENTS, APPARATUS AND METHODS

BACKGROUND OF THE INVENTION

1. Field of the Invention

This invention relates broadly to modular filter elements, filter apparatus and to methods of making and using such elements and apparatus. More particularly, it concerns modules that may be used to form rigid filter beds by positioning the modules side-by-side on a fixed base, methods of forming the modules from particulate material and binder, methods of forming filter beds from the modules and methods of filtering with the resulting filter beds.

2. Description of the Prior Art

There are a number of filtering operations in which a filter cake containing much fluid is formed and which presents special handling problems. In the operation of water and wastewater treatment plants this occurs in the process of dewatering water and wastewater sludge as a step in disposing of it. In conventional sludge dewatering operations, the sludge influent to the dewatering step will not contain over 2% solids. In order to handle the sludge as a "dry product" for trucking to a disposal site, the sludge should contain at least about 8% solids.

Water and wastewater treatment sludges can be divided into a few basic types, e.g., alum sludge (chemical), waste and wastewater sludge, aerobic domestic sewage sludge (bio-mass) and anaerobic digested domestic sewage sludge (bio-mass). The present invention relates to new devices and methods capable of handling all of such classes of sludge.

Typical filter apparatus for sludge dewatering is an open tank containing a bed of loose sand supported on a lower bed of gravel which, in turn, is supported upon the floor of the tank, usually made of concrete. This type equipment is referred to the trade as a sand bed.

As water is removed from the influent in such equipment a mushy filter cake builds up on the top of the sand layer until the cake contains about 6% solids. At such point, cracks start to occur in the cake and these grow as more water is removed. Depending upon the amount of time the sludge charge is allowed to remain in the equipment, it can be dewatered up to about 12-15% solids. At any point above about 6-8% solids content, the sludge is removed from the sand bed by shovels, back-hoes or other scraping or scooping devices. Usually a thin layer of sludge will remain on the top of the sand bed and will hinder the dewatering of the next batch of influent. Rakes or scrapers are often used to remove this sludge residue, but this can result in loss of sand eventually requiring replacement of the sand bed. Furthermore, this type sludge dewatering is undesirably slow and requires large area filters to attain needed throughput. Land acquisition costs, therefore, can be high.

Another type of sludge dewatering apparatus has used a rigid bed or plate of solid particles bound in a matrix of cured resin in place of the conventional sand bed (see U.S. Pat. No. 4,208,288). The broad idea of forming filter elements by combining aggregate particles with a resin matrix to form a rigid filter media (RFM) was, of course, know in the filter art well prior to that patent (see U.S. Pat. No. 3,538,020).

Outside the field of sludge dewatering it has also been known to form filter apparatus by creating a filter surface by placing rigid porous plates side-by-side in a tank and supported above the bottom of the tank to provide fluid removal space beneath the resulting filter bed. This type of equipment was developed as early as 1918 for use in filtering corrosive chemicals (see U.S. Pat. No. 1,277,832). The present invention extends this prior knowledge to provide new forms of filter elements and devices that are uniquely different from all such prior art devices.

While the invention is described with particular reference to water and wastewater sludge dewatering, the new elements, apparatus and methods may be effectively used for the filtration of a wide spectrum of other fluid suspensions, especially those that form filter cakes that are difficult to handle during and after their formation.

OBJECTS

A principal object of this invention is the provision of improvements in filter elements, apparatus and methods.

Further objects include the provision of:

(1) New forms of filter elements that may be assembled to form filter beds particularly useful for the dewatering of water and wastewater sludge.

(2) Filtration apparatus of simplified construction that is more effective in filtration ability and from which filter cake can be removed more efficiently than is the case with conventional sand bed filter apparatus.

(3) Filter elements of modular type that may be used to form filter beds that are strong enough to support the weight of machine driven scraping equipment for removal of filter cake from the bed.

(4) New methods for the production of filter apparatus.

(5) New forms of filter elements that combine a rigid filter plate with channels for filtrate removal.

(6) New forms of filter elements that are particularly useful for conducting vacuum filtering operations.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The stated objects are in part accomplished in accordance with the present invention by the provision of new filter elements in the form of modules for use in forming rigid filter beds that comprise a porous, polyhedal member having a continuous upper surface, a continuous lower surface coterminous to the upper surface, and a plurality of sides normal to said surfaces of substantially equal depth much shorter than their length, the modules consisting of a plurality of laminated layers, each layer being formed of particulate material of substantially uniform size rigidly fixed together in a solid bindermatrix. The particulate material of each layer is substantially different in size from that of the adjacent layer. The top surface is flat and the bottom surface is channelled. The layer comprising the top surface is formed of particles smaller in size than the particles of which the layer comprising the bottom surface is formed.

In preferred forms of the invention the new filter modules are rectangular (square) in shape and consist only of top and bottom layers with the particles in the top layer being about 5 to 15 mesh size and the particles in the bottom layer being between about 3/32 to ⅜ inch in size. Alumina is the preferred material for the top layer particles and natural river bed gravel the preferred material for the bottom layer.

The objects are further accomplished by the provision of apparatus for the dewatering of water and wastewater sludge which comprises a rectangular tank having a substantially flat bottom, an open top, and vertical sides, exit means through which filtrate may be removed from the tank, a plurality of the modules as described above positioned side by side within the tank with the bottom surfaces of the modules resting on the flat bottom of the tank, sealing material forming sludge-tight seals between adjacent edges of the modules and tank. The apparatus may also include conduit means by which water and wastewater sludge to be dewatered may be introduced into the tank onto the top surfaces of the modules.

The objects are also accomplished by a new method of treating water and wastewater sludge which comprises introducing sludge to be dewatered into the apparatus as described above, allowing liquid in the introduced sludge to flow through the modules that form the filter bed of the tank and flow via spaces existing between the bottoms of the modules and the flat bottom of the tank into the trough means thereby creating a layer of thickened sludge on the top surfaces of the modules, and removing the thickened sludge from the apparatus by running scrapers across the top surface of the filter bed.

BRIEF DESCRIPTION OF THE DRAWINGS

A more complete understanding of the invention may be had by reference to the attached drawings in which.

DESCRIPTION OF PREFERRED EMBODIMENTS

Figure 1:
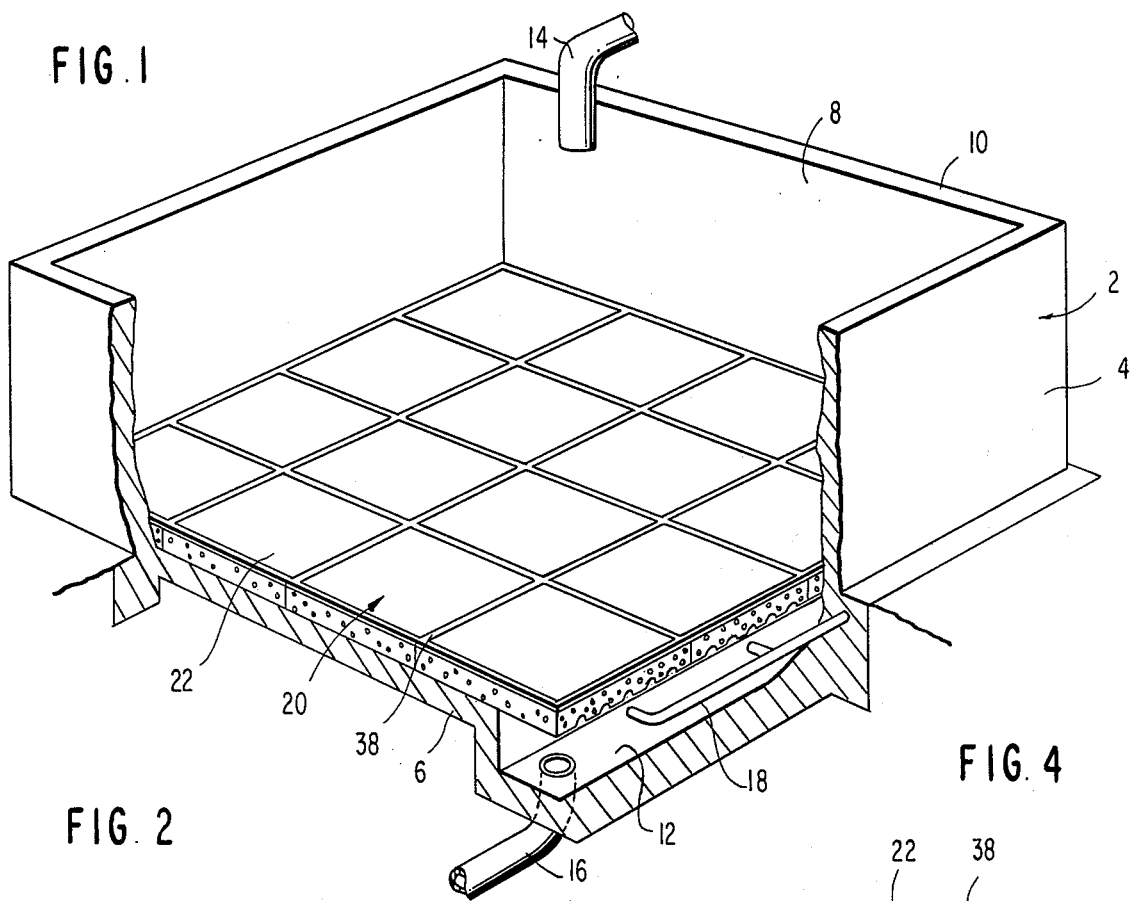
FIG. 1 is an isometric view partially in section of filter apparatus constructed in accordance with the invention.
Figure 2:
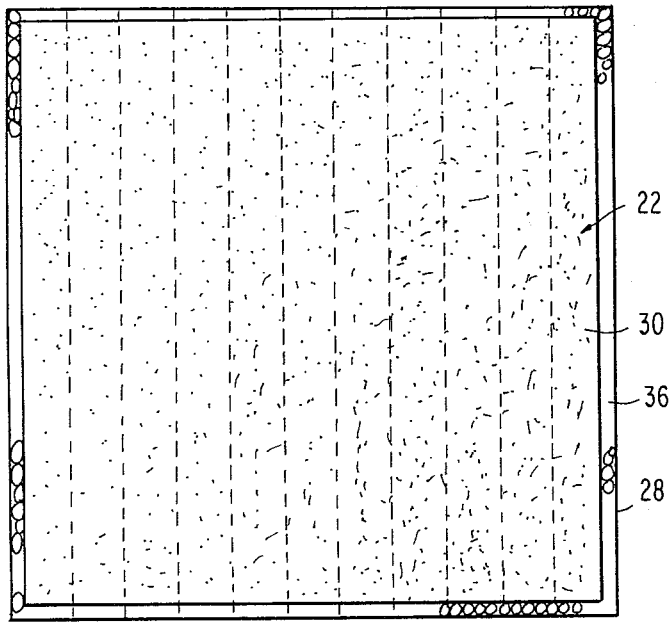
FIG. 2 is a plan view of a filter module of the invention.
Figure 4:
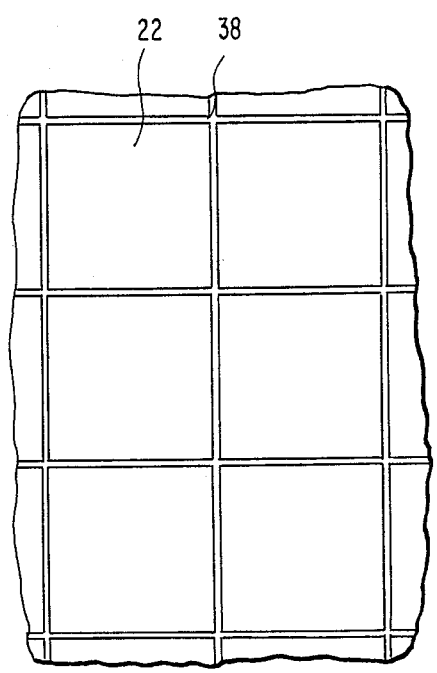
FIG. 4 is a fragmentary, plan view of a filter bed of the invention.
Figure 3:
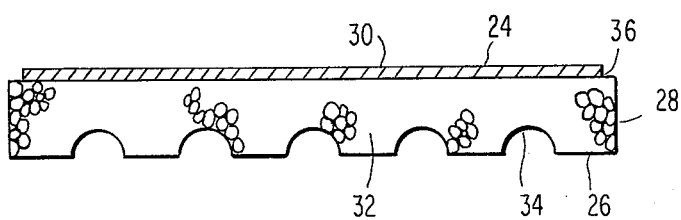
FIG. 3 is a lateral, sectional view taken on the line 3—3 of FIG. 2.

Referring in detail to the drawings the filter apparatus 2 comprises a rectangular tank 4 having a substantially flat bottom 6, an open top 8, vertical sides 10, trough means 12 through which filtrate may be removed from the tank 4 and conduit means 14 by which water and wastewater sludge or other influent to be filtered may be introduced into the apparatus 2.

The tank 4 is advantageously made of reinforced concrete, but may be made of metal or other material. The conduit means 14 may be a simple pipe, tube, etc. or may be more complex, e.g., a weir arrangement. The trough means 12 may include a drain pipe 16 to convey filtrate to storage (not shown), to a sewer, to irrigation means, etc. The tank 4 may include tube means 18 by which suction may be applied from below the filter bed 20 to assist the filter operation.

The rigid filter bed 20 comprises a plurality of modules 22 placed side-by-side and supported on the bottom 6 of the tank 4.

The modules 22 comprise a continuous upper surface 24, a continuous lower surface 26, and a plurality of sides 28 of substantially equal depth much shorter than their length. Each module contains a plurality of laminated layers 30 and 32 and each layer is formed of particulate material of substantially uniform size rigidly fixed together in a matrix of cured resin. The particulate material of each layer is substantially different in size from that of the adjacent layer. The top surface 24 is flat and the bottom surface 26 is corrugated providing a series of parallel grooves or channels 34 through which filtrate may flow between the modules 22 and the tank floor 6. The layer 30 comprising the top surface 24 is formed of particles smaller in size than the particles of which the layer 32 comprising the bottom surface 26 is formed. In preferred embodiments, the top surface layer particles are of about 5 to 15 mesh size and the bottom surface layer particles are substantially between about 3/32 and ⅜ inch in size.

The particles in the layers 30 and 32 may be formed of various materials that are chemically inert to the influents to be handled in the apparatus 2. Preferably, the particles should have smooth surfaces. By way of example, the preferred material for the layer 32 is natural river bed gravel as opposed to crushed gravel which is unsatisfactory because of its sharp edges. Typically the river bed gravel will be ¼ inch nominal size and will contain particles 60 to 70% larger than ⅜", not more than 5% larger than ½" and all passing ¾", e.g., 100% passing sieve size ¾", 96.5% past size ½", 37% past ⅜" size, 4% past 3/16" size, and 2% past 3/32" size. Gravel furnished to ASTM Spec. 33–81, size 7 that shows similar gradation can also be used to advantage.

The preferred material for the layer 30 is tabular alumina. Typical specifications for the alumina include 8–14 mesh size (Tyler), hardness of 9 on the mohs scale, apparent density of 3.4–3.6, water adsorption of about 1.5% and a porosity of about 5%. Less preferred particle materials for any of the layers include ceramic beads, glass beads, ball milled crushed stone, or the like.

The layer 32 is approximately coterminous with layer 30 except that layer 32 extends a short distance, e.g., ¼ to ½", at each side beyond the edge of layer 30 providing the ledges 36 around the periphery of layer 30. When the plurality of the modules 22 are assembled to form the filter bed 20, the ledges 36 are filled with sealing material 38 to the level of the top surface 24. This provides the bed 20 with a completely continuous, relatively smooth surface from which filter cake (not shown) may be easily removed by scrapers, shovels, or the like. A particular feature of the new apparatus 2 is the ability of the filter bed 20 to support the weight without damage of bulldozers and similar heavy machine driven scrapping equipment to remove the dewatered sludge or other filter cake.

A typical module of the invention will be square with sides 28 about 2 ft. long and 3–4" high. The bottom layer is advantageously about 5 to 10 times the thickness of layer 30, e.g., in a typical module layer 30 will be ⅜" thick, layer 32 will be 2 to 3" thick, channels 34 will be semi-circular in shape with 2" diameters and about 4" on centers. Instead of square modules, they may be rectangular, hexagonal, etc. Instead of semi-circular channels, they may be other shapes, e.g., square, triangular, rectangular, pentangular, etc. Also, they may comprise more than two laminated layers, e.g., there can be a top layer such as layer 30 and several layers like layer 32, each of the latter being made of different size particles.

The binder preferably used as the matrix material for binding the layer particles into a rigid filter media is epoxy resin, a generally recognized class of resin material capable of conversion to a cured condition upon suitable admixture with a catalyst (cross-linking agent). Other resins may be used, e.g., phenol-formaldehyde resins, urea-aldehyde resins, polyester resins, resorcinol-aldehyde resins and equivalent curable resins. A preferred matrix material is epoxy resin that meets the requirements of VDHT Specification Section 254.01, Type EP-4. Physical properties of the cured resin include tensile strength 3000 psi minimum, elongation 3% maximum, compression 10,000 psi minimum and compressive modular strength 475,000 psi minimum.

The matrix component of the filter module layers may be varied and will depend to some extent on the particle material and its size. Since the matrix material is much more expensive than the aggregate the smallest amount will be used that will provide the desired strength properties to the modules. Larger aggregate requires less matrix resin than smaller aggregate. The matrix content of the modules may advantageously be between about 0.01 to 10% by weight. For layer 30 made with alumina as above described, the preferred matrix content is about 4–6% by weight: for layer 32 made with gravel the preferred matrix content is about 0.01–0.5% by weight. Using preferred materials as stated the material requirements for a typical 2' square module will be 12–16 lbs. alumina, 1 cu. ft. gravel, 0.4 qts. of epoxy resin for the alumina and 1.5 qts. for the gravel.

The first step in forming modules of the invention is to mix together the two components of the matrix material. Then this prepared resin material is mixed with the proper amount of gravel until all the gravel particles are thoroughly coated with the liquid resin. Molds made of wood or steel with bottoms contoured to form the drainage channels 34 that have been treated with release agent are then loaded with the resin coated gravel. The load mass is then tamped and screeded to form a level surface that is about ⅜" below the top surface of the sides of the mold as defined by ⅜"×⅜" bars in the sides of the mold used to create the recesses 36 in modules 22. The alumina is next mixed and coated with the proper amount of premixed liquid resin, loaded into the mold on top of the gravel and after screeding is trowled to a smooth surface. The resin will fully cure in three days, but within 24 hours will attain 75% of full strength and the module may be removed from the mold.

To from a filter apparatus 2 of the invention, a plurality of the modules are positioned side-by-side in a tank 4 that has been prepared on the site. The spaces between adjacent modules defined by the ledges 36 are then filled with resin coated particulate material, cement, caulking or other sealing material and screeded level with the top surfaces 24 of the modules. Upon proper hardening of the sealing material, the filter apparatus thus constructed is ready for use in dewatering water and wastewater sludge or any other desired filter operation.

The embodiments of the invention in which an exclusive property or privilege is claimed are defined as follows:

1. A module for use in forming a rigid filter bed comprising a porous, polyhedal element having a continuous top surface, a continuous bottom surface approximately coterminous to said upper surface, and a plurality of sides normal to said surfaces of substantially equal depth much shorter than their length, said element being formed of a plurality of laminated layers, each layer comprising particulate material of substantially uniform size rigidly fixed together in a matrix of solid binder, the particulate material of each layer being substantially different in size from that of the adjacent layer, said top surface being flat and said bottom surface being channelled, the layer comprising said top surface being formed of particles smaller in size than the particles of which the layer comprising said bottom surface is formed.

2. The module of claim 1 wherein said surfaces are rectangular and said layer comprising said top surface is substantially thinner than the other layers of the element.

3. The module of claim 2 wherein said surfaces are square and said element has only two layers.

4. The module of claim 3 wherein said top surface layer particles are of about 5 to 15 mesh size and said bottom surface layer particles are substantially between about 3/32 and ¾ inch in size.

5. The module of claim 4 wherein said top surface layer particles are tabular alumina and said bottom surface layer particles are natural river bed gravel.

6. Apparatus for the dewatering of water and wastewater sludge which comprises;
   a tank having a substantially flat bottom, an open top, and vertical sides,
   exit means through which filtrate may be removed from said tank,
   a plurality of the modules as defined in claims 1 positioned side by side within said tank with the bottom surfaces of said modules resting on said flat bottom of said tank, and
   sealing material forming sludge-tight seals between adjacent edges of said modules.

7. A module for use in forming a rigid filter bed by laying a plurality of the modules side-by-side upon a flat base comprising a porous, planar element having a continuous, rectangular top surface, a continuous bottom surface approximately coterminous to said upper surface, and four sides normal to said surfaces of substantially equal depth much shorter than their length, said element being formed of two laminated layers, each layer being formed of particulate material of substantially uniform size particles rigidly fixed together by a binder forming a matrix, the particles of th top layer being substantially smaller in size that the particles of the bottom layer, said top layer being substantially flat and said bottom surface having therein a plurality of substantially semi-circular channels.

8. The module of claim 7 wherein the particles of said top layer are of size between 8 to 14 mesh and formed of tabular alumina, the particles of said bottom layer are natural river bed gravel of size between about 3/32 and ¾ inch and said resin is epoxy resin.

9. The method of treating water and wastewater sludge which comprises:
   (a) introducing sludge to be dewatered into apparatus that comprises:
      a tank having a substantially flat base, an open top, and vertical sides, exit means through which filtrate may be removed from said tank, a plurality of modules laid side-by-side within said tank upon said flat base, each module comprising a porous, planar element having a continuous, rectangular top surface, a continuous bottom surface approximately coterminous to said upper surface, and four sides normal to said surfaces of substantially equal depth much shorter than their length, said element being formed of two laminated layers, each layer being formed of particulate material of substantially uniform size particles rigidly fixed together by a binder forming a matrix, the particles of th top layer being substantially smaller is size that the particles of the bottom layer, said top layer being substantially flat and said bottom surface having therein a plurality of substantially semi-circular channels and sealing material forming sludge-tight seals between adjacent edges of said modules, (b) allowing liquid in said introduced sludge to flow through said modules and flow via said channels over said flat base into said exit means thereby creating a layer of thickened sludge on the top surfaces of said modules, and (c) removing thickened sludge from said apparatus by running scrapers across said top surfaces.

10. The method of claim 9 wherein said scrapers are bulldozers or like machine driven scrapers.

* * * * *

UNITED STATES PATENT OFFICE
CERTIFICATE OF CORRECTION

PATENT NO. : 4,431,549
DATED : February 14, 1984
INVENTOR(S) : Edward J. Highstreet, Forrest B. Stannard, etal.

It is certified that error appears in the above-identified patent and that said Letters Patent are hereby corrected as shown below:

First page, in item [73] (Assignees) delete:
"; Infilco Degremont Inc., Richmond, Va."

Signed and Sealed this

Twenty-fourth Day of July 1984

[SEAL]

Attest:

GERALD J. MOSSINGHOFF

Attesting Officer          Commissioner of Patents and Trademarks